United States Patent
Knuth et al.

(10) Patent No.: US 7,310,691 B2
(45) Date of Patent: Dec. 18, 2007

(54) NETWORK SUBSCRIBER STATION FOR A NETWORK OF DISTRIBUTED STATIONS, AND METHOD FOR OPERATING A NETWORK SUBSCRIBER STATION

(75) Inventors: Kurt Knuth, Hannover (DE); Frank Gläser, Hannover (DE); Jens Brocke, Laatzen (DE); Ralf Köhler, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/565,032

(22) PCT Filed: Jul. 20, 2004

(86) PCT No.: PCT/EP2004/008096

§ 371 (c)(1),
(2), (4) Date: Jan. 17, 2006

(87) PCT Pub. No.: WO2005/015849

PCT Pub. Date: Feb. 17, 2005

(65) Prior Publication Data
US 2007/0028008 A1 Feb. 1, 2007

(30) Foreign Application Priority Data
Jul. 31, 2003 (DE) ................................. 103 35 572

(51) Int. Cl.
*G06F 13/00* (2006.01)
*G06F 12/00* (2006.01)

(52) U.S. Cl. .................... 710/10; 711/102; 713/100

(58) Field of Classification Search .................. 710/8, 710/10, 104; 711/102, 5, 170; 714/6, 7; 713/1, 2, 100; 719/327
See application file for complete search history.

(56) References Cited

U.S. PATENT DOCUMENTS 5,764,930 A * 6/1998 Staats .......................... 710/107
6,237,091 B1 * 5/2001 Firooz et al. .................. 713/1

(Continued)

FOREIGN PATENT DOCUMENTS

EP         1307005       5/2003

OTHER PUBLICATIONS

The Promoters of the 1394 Open HCI: "1394 Open Host Controller Interface Specification Release 1.1", Jan. 6, 2000, Retrieved from the Internet.

(Continued)

*Primary Examiner*—Glenn A. Auve
*Assistant Examiner*—Trisha Vu
(74) *Attorney, Agent, or Firm*—Joseph J. Laks; Robert D. Shedd; Catherine A. Ferguson

(57) ABSTRACT

The invention relates to a network subscriber station and to a method for operating a network subscriber station for a network of distributed stations, particularly a network of IEEE 1394 network subscriber stations, which are connected by means of a data bus. The network subscriber station comprises at least three memory areas for operation-dependent interface configuration data and pointer means, which comprise electronic pointers to the at least three memory areas, and driver means for handling electronic data in the at least three memory areas and for electronic data transfer between the at least three memory areas.

3 Claims, 4 Drawing Sheets

U.S. PATENT DOCUMENTS 6,643,714 B1 * 11/2003 Chrysanthakopoulos ....... 710/8
6,671,768 B1 * 12/2003 Brown ....................... 711/102
6,925,558 B2 *  8/2005 Kendall ...................... 713/100
6,978,327 B1 * 12/2005 Ishida et al. ................ 710/100
7,124,227 B2 * 10/2006 Gadeken et al. ............ 710/300

OTHER PUBLICATIONS

Copy of Search Report dated Dec. 9, 2004.

* cited by examiner

| Reference number | Meaning |
|---|---|
| 1 | Data Bus |
| 2 | Network Subscriber Station |
| 3 | Interface Node |
| 4 | Hardware Means |
| 5 | Software Means |
| 6 | Application Software |

| T | ActualPtr | NextPtr | EditPtr | AuxPtr | Description |
|---|---|---|---|---|---|
| T0 | A(0) | A(0) | B(0) | C(?) | Initial stage |
| T1 | A(0) | A(0) | B(0') | C(?) | Edit |
| T2 | A(0) | A(0) | B(1) | C(?) | (0), Editing ended |
| T3 | A(0) | B(1) | C(?) | A(0) | (1)...(4), test (5)➤ "FALSE" |
| T4 | A(0) | B(1) | C(1) | A(0) | (9) |
| T5 | B(1) | B(1) | C(1) | A(0) | Reset operation |
| ... | | | | | |
| T10 | B(1) | B(1) | C(1') | A(0) | Edit |
| T11 | B(1) | B(1) | C(2) | A(0) | (0), Editing ended |
| T12 | B(1) | C(2) | A(0) | B(1) | (1)...(4), test (5)➤ "FALSE" |
| T13 | B(1) | C(2) | A(2) | B(1) | (9) |
| T14 | B(1) | C(2) | A(2') | B(1) | Edit |
| T15 | B(1) | C(2) | A(3) | B(1) | (0), Editing ended |
| T16 | B(1) | A(3) | B(1) | C(2) | (1)...(4), test (5)➤ "TRUE" |
| T17 | B(1) | A(3) | C(2) | B(1) | (6)...(8) |
| T18 | B(1) | A(3) | C(3) | B(1) | (9) |
| T19 | A(3) | A(3) | C(3) | B(1) | Reset operation |
| ... | | | | | |
| T30 | A(1) | B(2) | C(3) | A(1) | (0), Editing ended |
| T31 | B(2) | B(2) | C(3) | A(1) | Reset operation |
| T32 | B(2) | C(3) | A(1) | B(2) | (4), test (5)➤ "FALSE" |
| T33 | B(2) | C(3) | A(3) | B(2) | (9) |
| ... | | | | | |
| T40 | A(1) | B(2) | C(3) | A(1) | (0), Editing ended |
| T41 | A(1) | C(3) | A(1) | B(2) | (4) |
| T42 | C(3) | C(3) | A(1) | B(2) | Reset operation, test (5) ➤ "FALSE" |
| T43 | C(3) | C(3) | B(3) | A(1) | (9) |
| ... | | | | | |
| T50 | A(1) | B(2) | C(3) | A(1) | (0), Editing ended |
| T51 | A(1) | C(3) | A(1) | B(2) | (4), test (5)➤ "TRUE" |
| T52 | C(3) | C(3) | A(1) | B(2) | Reset operation |
| T53 | C(3) | C(3) | B(2) | A(1) | (6) ... (8) |
| T54 | C(3) | C(3) | B(3) | A(1) | (9) |
| ... | | | | | |

Fig.3

NETWORK SUBSCRIBER STATION FOR A NETWORK OF DISTRIBUTED STATIONS, AND METHOD FOR OPERATING A NETWORK SUBSCRIBER STATION

The invention relates to a network subscriber station for a network of distributed stations, particularly in connection with IEEE 1394 network subscriber stations, and to a method for operating a network subscriber station.

PRIOR ART

Interfaces are used in connection with electrical/electronic appliances in order to allow the individual appliance to communicate electronically, particularly to send and receive electronic data, which are usually transmitted using a data bus which is connected to the appliance. Depending on the data bus used and on the electrical/electronic appliances connected to the data bus, there are various standards for interface configurations. One interface standard to which a great deal of attention has been devoted recently is the IEEE 1394 standard. IEEE 1394 provides a standard which is particularly suitable for assisting data interchange between multimedia devices of any kind. A data bus which is configured on the basis of the IEEE 1394 standard can be connected both to peripheral devices associated with a computer, such as printers, scanners, CD drives and hard disks, and to domestic electronic appliances, such as video cameras or televisions. A great deal of influence on the digitization of electronic appliances is therefore expected from this standard.

The IEEE 1394 standard involves a reset operation ("bus reset") being carried out on the data bus when an electronic appliance is connected to the data bus, an electronic appliance is disconnected from the data bus or when the configuration data for an appliance have changed. In the case of a reset operation on the data bus, every IEEE 1394 interface node which is connected to the data bus sends an independent ID (identification) information item to the other network subscriber stations. This ensures that every network subscriber station in a network of distributed stations connected by means of the data bus is informed about which other network subscriber stations are connected in the network. The independent ID information item is used by each interface node to identify itself to the other interface nodes in the network. Using the independent ID information item received from the other respective interface nodes, each interface node in the network is able to create an "interface node list" and to store it in a memory device respectively associated with the interface node. This stored information item can then be processed by a driver program on the respective network subscriber station when managing the data packet to be transmitted and received via the data bus.

In addition, a reset operation on the data bus serves as a request to the interface nodes in the connected electrical/electronic appliances to read each other's interface configuration data. The interface configuration data are stored in memory areas in a ROM (Read Only Memory) store in the network subscriber station, which are also referred to as ConfigROM memory areas. The content of the interface configuration data in the memory areas is operation-dependent, i.e. it can change during operation of the network. Such a change may result in the stored interface configuration data being changed while a reset operation and the associated request for reciprocal reading of the interface configuration data is being received. This results in the problem that sometimes inconsistent and/or incomplete interface configuration data are read, since the interface configuration data are edited at a parallel time on account of changes on the respective electrical/electronic appliance.

To avoid this problem, known chipsets based on the "1394 Open Host Controller Interface, Release 1.1" specification already comprise options for measures. In this context, provision is made for a register which contains an electronic pointer to a current ROM memory area to be accompanied by the implementation of a further electronic pointer which points to a further ROM memory area which stores interface configuration data which are provided for reading after a subsequent reset operation on the data bus. The further electronic pointer is not adopted as the new address for the current ROM memory area during a subsequent reset operation until a read request which has been started has been executed. However, this means that the reading of inconsistent interface configuration data cannot be prevented. If, by way of example, a reset operation occurs while the interface configuration data are being edited in the further ROM memory area, then there is the risk that incompletely changed interface configuration data will be read.

The appliance reading the interface configuration data can—if it establishes that there is an inconsistency—repeat the read operation, e.g. can take place in connection with a preceding further reset operation. However, this results in increased data traffic on the data bus and hence in increased reaction times in the network of network subscriber stations. In most cases, the inconsistency in the interface configuration data is not noticed at first, however, since many appliances carry out no or only inadequate CRC (Cyclic Redundancy Check, check sum evaluation) checks on account of the increased reading involvement associated therewith. A data record which is output incorrectly in this manner can result in serious disruptions to the way in which the network works.

INVENTION

It is an object of the invention to specify an improved network subscriber station and also an improved method for operating the network subscriber station in a network of distributed stations where any operating situations when reading ROM memory areas with interface configuration data have the assurance of reading being independent of possible operations for editing the interface configuration data.

This object is achieved by a network subscriber station based on the independent claim 1 and a method for operating the network subscriber station based on the independent claim 3.

The invention covers the concept of providing at least three memory areas for operation-dependent interface configuration data in the implemented data link layer in the case of a network subscriber station for a network of distributed stations, particularly a network of IEEE 1394 network subscriber stations, which are connected by means of a data bus and have a respective implemented data link layer. Pointer means, which comprise electronic pointers to the at least three memory areas, can be used to access the at least three memory areas, which means that stored data can be read and/or written in. In addition, driver means are provided in order to handle electronic data in the at least three memory areas and to transfer them between the at least three memory areas.

Using the at least three memory areas, it is possible to use a plurality of memory areas to store interface configuration data such that a current, complete and inherently consistent set of interface configuration data is always available for reading the interface configuration data on account of a reset operation on the data bus. To achieve this, various versions of the interface configuration data can be transferred arbitrarily between the plurality of memory areas according to a scheme which is possibly dependent on the implementation. Correct readable interface configuration data are available at all times. There is no increased data traffic which is required on account of repetitions of incorrectly handled read requests after a reset operation in connection with known methods. As a result, the reaction time and hence the operating convenience of the network with the electrical/electronic appliances, which are coupled via interface nodes, are also improved.

DRAWING

The invention is explained in more detail below using an exemplary embodiment with reference to a drawing, in which:

FIG. 3 shows an overview of address pointer use in table form; and

EXEMPLARY EMBODIMENT OF THE INVENTION

Figure 1:
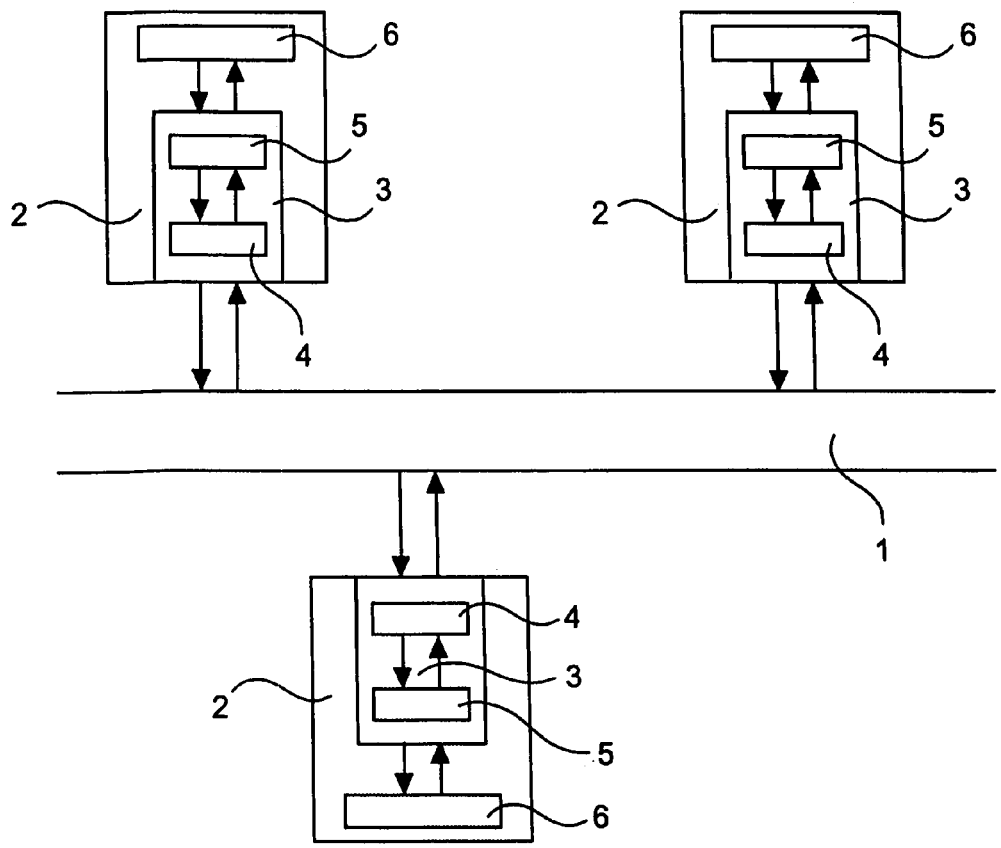
FIG. 1 shows a schematic illustration of a network with electrical/electronic appliances which are connected to a data bus via a respective interface node.

FIG. 1 shows a schematic illustration of a network in which a plurality of network subscriber stations 2 are connected to a data bus 1 via a respective interface node 3 for the purpose of sending/receiving data packets via the data bus 1. The respective interface node 3 is in the form of an IEEE 1394 interface node, which allows, in particular, coupling/decoupling of the network subscriber stations 2 and data packet interchange between the network subscriber stations 2 connected to the data bus 1. The interface device comprises hardware means 4 and software means 5 for operating the hardware means 4. The hardware means 4 are used, in particular, to send and receive data packets via the data bus 1. The software means 5 comprise, in particular, a driver program for operating the hardware means 4, in order to provide the functionalities of the network subscriber station 2. A piece of application software 6 respectively installed in the network subscriber station 2 uses the interface node 3 in order to send or receive data packets via the data bus 1.

Particulars relating to the design and configuration of an interface based on the IEEE 1394 standard are known to the person skilled in the art and are therefore not explained in detail at this point. Thus, an IEEE 1394 interface normally has a three-layer structure comprising a transaction layer, a data link layer and a physical layer. A bus management function monitors and controls the three layers and provides various functions for controlling the respective interface node. In this context, the transaction layer provides an interface (a service) for transactions with layers arranged above the interface node. The data link layer essentially provides the following functions: addressing, data checking, data formation for packet transmission/packet reception etc. The physical layer converts logical symbols used by the data link layer into electrical signals, performs data bus equalization and defines the physical data bus interface. The physical layer and the data link layer are normally produced using hardware means, for example as a data transfer control device (interface chip). Separate ICs for the two layers are available on the market. The transaction layer is normally produced using firmware, which runs on a processor, or hardware.

Figure 2:
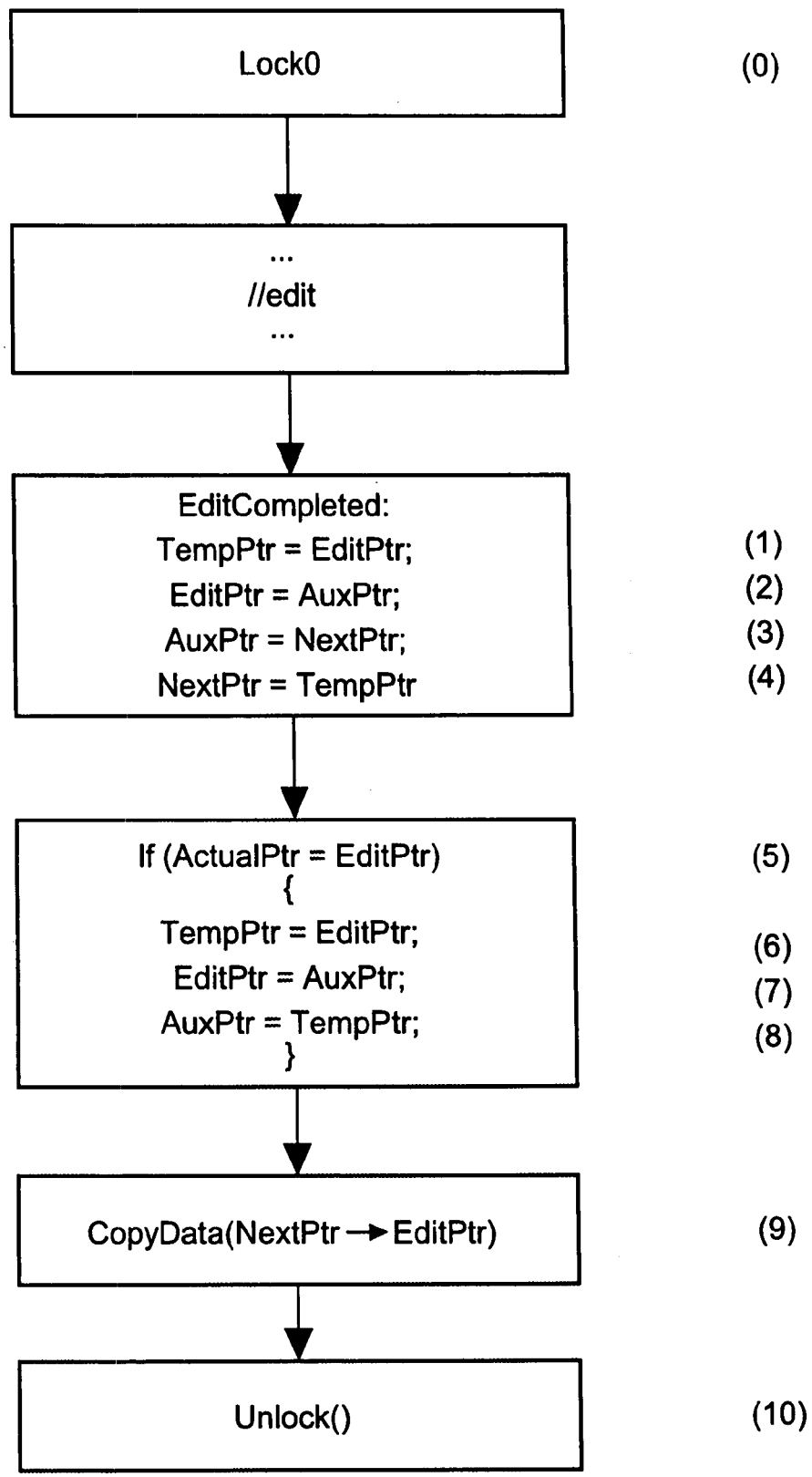
FIG. 2 shows a schematic flowchart for an edit operation for interface configuration data.
Figure 4:
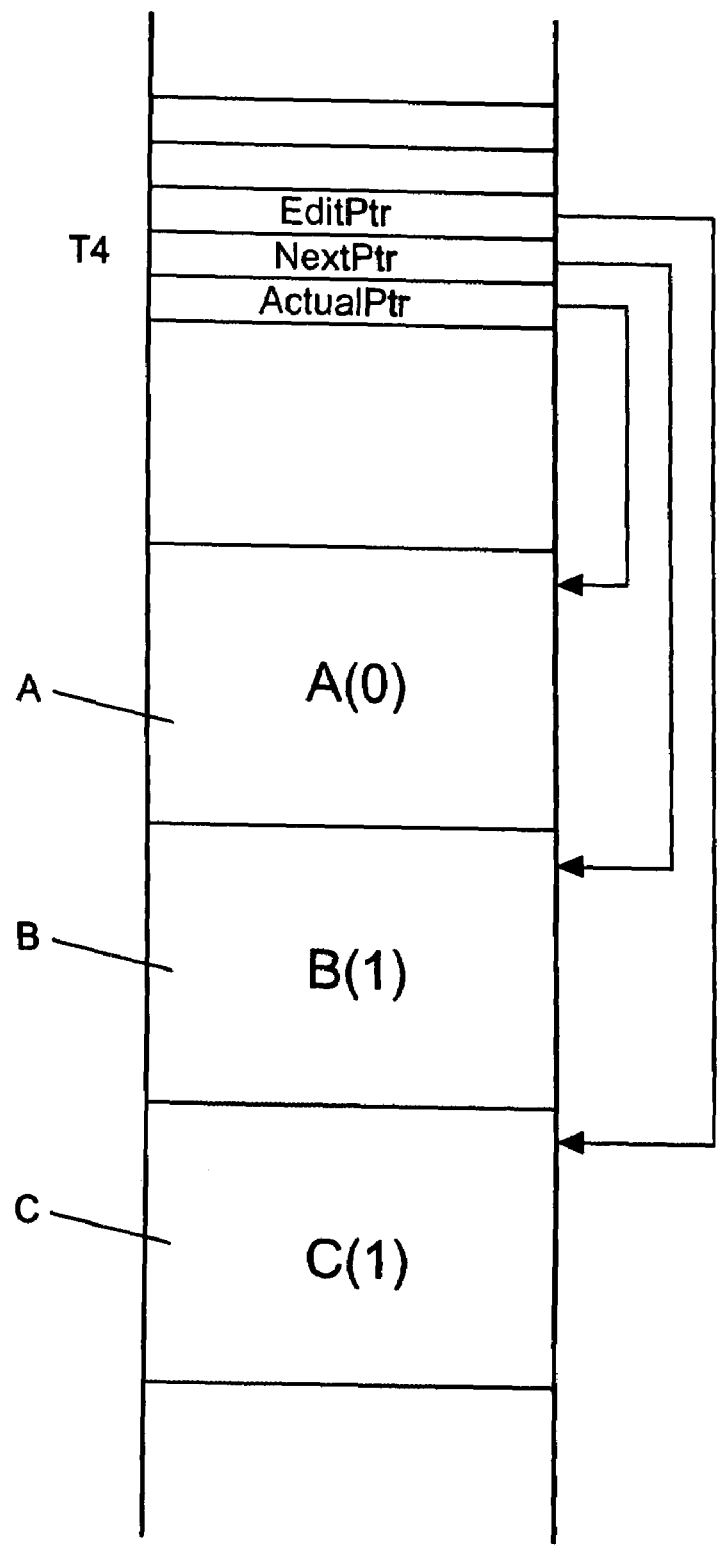
FIG. 4 shows an arrangement of three Config ROM's for operation-dependent interface configuration data.

With reference to FIGS. 2 and 3, the text below gives a detailed description of the sequence for storing and handling the interface configuration data in a plurality of ROM memory areas. The ROM memory areas do not need to be in the form of physical ROM stores. Instead, these memory areas may have been created in the RAM store in the respective network station. This is done by a memory management unit in the network station. The memory management unit reserves/allocates the necessary memory areas. The RAM store is not exclusively associated with the data link layer. Other components may also access it, particularly a microcontroller in the network station which is controlled by the software means for implementing the higher layers.

In this context, FIG. 2 schematically shows a flowchart for method steps during an edit operation for interface configuration data. Before editing, an electronic address pointer is set, in the course of bus reset handling, as follows: ActualPtr=NextPtr. As FIG. 2 shows, the edit operation then comprises a total of eleven instructions (0) . . . (10), which are shown in FIG. 2 by means of pseudocode.

The instructions (0) and (10) (Lock( ) and Unlock( )) are necessary in order to prevent simultaneous edit operations by a plurality of applications.

In the description below, it is assumed that the network subscriber stations have three ROM memory areas implemented in them for which the labels ConfigROM A, ConfigROM B and ConfigROM C are chosen. The ROM memory areas can be accessed by the driver means in the associated network subscriber station using electronic address pointers ActualPtr, NextPtr and EditPtr. Depending on the method level, the electronic address pointers ActualPtr, NextPtr and EditPtr can be loaded into three address registers. ActualPtr points to the memory area in the ConfigROM which contains the interface configuration data for a current read request. NextPtr points to the memory area in the ConfigROM which contains changed interface configuration data for answering read requests after a subsequent reset operation. EditPtr points to the memory area in the ConfigROM in which changes can be made to the interface configuration data stored therein. In addition, two buffer areas AuxPtr and TempPtr for address pointers are provided which as auxiliary memory areas are likewise implemented in the memory area.

FIG. 3 shows a tabular overview of the effect of changes in the interface configuration data stored in the ConfigROMs A, B, C and the effect of reset operations on the contents of the address registers, and also the respective (present) operation of the ConfigROMs A, B, C during the sequence described. In the tabular overview shown in FIG. 3, the following five scenarios are described: T0-T5: editing with subsequent reset operation; T10-T19: editing and re-editing of the interface configuration data and subsequent reset operation on the data bus; T30-T33: reset operation after the end of the second edit between instructions (0) and (1) (cf. FIG. 2); T40-T43: reset operation after the end of the second edit between the instructions (4) and (5); and T50-T54: reset operation after the end of the second edit between the instructions (5) and (6).

The time T0 represents an initial state in which the ConfigROM A contains a data record 0 and is used for current read requests as a result of reset operations on the data bus. NextPtr likewise points to the ConfigROM A, since no other changed interface configuration data for use after a subsequent reset operation exist. ConfigROM B, which likewise contains the data record 0, can hold changes. At the time T1, ConfigROM B is changed. In the course of the change, the data record 0 containing interface configuration data is changed to the data record 0' containing changed interface configuration data. The editing carried out in the process has finished at time T2. ConfigROM B then contains a data record 1 containing changed interface configuration data for which the change is complete.

At time T3, address pointer changeover takes place. When carrying out the instructions (1) . . . (4) (cf. FIG. 2), the operation (ActualPtr=EditPtr) gives the result "FALSE", which is why the instructions (6) . . . (8) are not executed. Next, at time T4, a copy operation takes place, which involves the data content of the memory area to which the NextPtr (B(1)) points being copied to the area to which the EditPtr points. At time T5, a reset operation now occurs on the data bus and prompts reading of the interface configuration data. During the reset operation, the ActualPtr is set to the value of NextPtr. All read requests which now occur as the result of a reset operation at the interface nodes are handled using the data record from ConfigROM B (data record 1).

At time T10, there follows a further editing phase, which is finished at time T11. At time T12, address pointer changeover again takes place, which leads to the result "FALSE" being obtained after execution of the instructions (1) . . . (4) (cf. FIG. 2). This is followed by another copy operation, further editing and termination of the further editing at times T13, T14, T15. At time T16, address pointer changeover takes place again. Unlike in the case of previous executions of the instructions (1) . . . (4), "TRUE" is now obtained, which means that the instructions (6) . . . (8) are executed at time T17. As a result, the entries in EditPtr and AuxPtr are interchanged. The effect achieved by this is that EditPtr points to ConfigROM C. ConfigROM C is available for editing after the subsequent reset operation on the data bus. Next, the current data record is copied to ConfigROM C at time T18. As a result of a reset operation at time T19, ActualPtr now points to the newest data record.

The scenarios which follow in the tabular overview in FIG. 3 begin, as a succession of two edit operations which have already been performed without an interim reset operation, with three different data records from interface configuration data in the ConfigROMs A, B, C (respective starting points T30, T40, T50). The tabular overview in FIG. 3 shows that a reset operation may arise at any time in the sequence without edit operations endangering the consistency of the current ConfigROM.

The use of the three ConfigROMs A, B, C in the manner described prevents the occurrence and transmission of inconsistent interface configuration data as a result of a reset operation on the data bus, even if reset operations occur during the change operation for editing the interface configuration data, since only ever the interface configuration data in the memory area in the ConfigROMs are edited which is used neither at the current time nor after the next reset operation for current enquiries, that is to say a temporary inconsistency might exist. Hence, there is always a ROM memory area available for interface configuration data to be changed which is independent of a current and a subsequent read operation, which are respectively triggered as a response to a reset operation.

The invention claimed is:

1. A network subscriber station for a network of distributed stations, which are connected by means of a data bus, comprising:
    at least three reserved memory areas for operation-dependent interface configuration data;
    pointer means, which comprise electronic pointers for pointing to the at least three reserved memory areas;
    wherein a first of the at least three reserved memory areas is a current memory area for holding current interface configuration data, a second of the at least three reserved memory areas is a subsequent memory area for holding interface configuration data which are provided for retrieval after a subsequent reset operation on the data bus, and a third of the three memory areas is an editing memory area for holding editable interface configuration data,
    wherein said pointer means further comprises a first electronic pointer, a second electronic pointer and a third electronic pointer pointing to the current interface configuration data, the configuration data to be used after a subsequent bus reset, and the editable configuration data respectively;
    means for setting said second electronic pointer to configuration data to which said third electronic pointer points and means for setting the third pointer to configuration data to which neither the second electronic pointer points nor configuration data to which the third electronic pointer points;
    means for copying said configuration data to which the second electronic pointer points to the memory area to which the third electronic pointer points for completing editing in said third memory area; and
    means for setting said first electronic pointer to configuration data to which the second electronic pointer points immediately upon an occurrence of a bus reset event.

2. The network subscriber station according to claim 1, wherein said network subscriber station further comprises an IEEE 1394 bus interface to communicate to an IEEE 1394 bus network.

3. A method for operating a network subscriber station for a network of distributed stations, which are connected by means of a data bus, said method comprising:
    electronically pointing to at least three memory areas containing therein operation-dependent configuration data;
    handling electronic data in the at least three memory areas;
    electronically transferring said operation-dependent configuration data between the at least three memory areas;
    wherein a first of the at least three reserved memory areas is a current memory area for holding current interface configuration data, a second of the at least three reserved memory areas is a subsequent memory area for holding interface configuration data which are provided for retrieval after a subsequent reset operation on the data bus, and a third of the three memory areas is an editing memory area for holding editable interface configuration data,
    wherein said electronically pointing step further comprises electronically pointing using a first electronic pointer, a second electronic pointer and a third electronic pointer pointing to the current interface configuration data, the configuration data to be used after a subsequent bus reset, and the editable configuration data respectively;

setting said second electronic pointer to configuration data to which said third electronic pointer points and setting the third pointer to configuration data to which neither the second electronic pointer points nor configuration data to which the third electronic pointer points;

copying said configuration data to which the second electronic pointer points to the memory area to which the third electronic pointer points for completing editing in said third memory area; and setting said first electronic pointer to configuration data to which the second electronic pointer points immediately upon an occurrence of a bus reset event.

* * * * *